3,146,261
PREPARATION OF ORGANOBORON HALIDES

Lahmer Lynds, North Hollywood, and David R. Stern, Fullerton, Calif., assignors to American Potash & Chemical Corporation, a corporation of Delaware
No Drawing. Filed Nov. 7, 1958, Ser. No. 772,424
1 Claim. (Cl. 260—543)

This invention relates to the preparation of alkyldihaloborines and bis(dihaloborino)alkanes by a metathesis reaction between an organoboron halide and a different boron trihalide, which reaction involves simple redistribution of halogens and requires no catalysts.

Organoboron compounds have recently demanded extensive investigation as starting substances for high polymers and high energy chemicals. Alkyldihaloborines and bis(dihaloborino)alkanes are important intermediates in the formation of polymers, substituted borazoles, hydrides, boronic acids and their esters and anhydrides (boroxines). They may also be used for pyrophoric fuels and it is for this purpose that they may be used directly without being converted to other compounds. A preferred utility for the alkyldihaloborines and bis(dihaloborino)alkanes is as igniters in the event of jet flameouts. These compounds also find use as preignition inhibitors in gasoline. But use of these compounds has been severely limited because of uneconomical and complicated methods of synthesis, which in many instances gave mixtures that could not be separated into pure components.

Therefore, it is an object of this invention to provide a process for the preparation of aryl and alkyldihaloborines and bis(dihaloborino)alkanes which may be easily carried out and which provides high yields of the desired products.

A further object is to provide a method which is readily adaptable to a continuous process utilizing a flow system and inexpensive raw materials.

Broadly, it has been found that a metathetical reaction whereby halogen atoms are replaced takes place when either an aryldihaloborine, an alkyldihaloborine or a bis-(dihaloborino)alkane and a boron trihalide (the halogen of the trihalide being of greater molecular weight than the halogen in the organo compound) are refluxed in a suitable system whereby the relatively volatile boron halide by-products can be continuously removed.

Catalysts are not necessary and in all cases the desired compounds are specifically formed. No side reactions take place to any appreciable extent, and only small quantities of mixed boron halides are detected in the by-products. Almost quantitative yields can be obtained when a stoichiometric excess of the boron trihalide is used and a suitable recovery system is employed.

A preferred reaction temperature range is from 25° C. to 180° C. though under certain circumstances even more extreme temperatures may be used with some additional inconvenience. At 180° C. most alkyldihaloborines begin to decompose and the same has been found to be the case with many of the bis(dihaloborino)alkanes. Hence, this temperature may be set as a practical upper limit for carrying out most of the process species of this invention. As a matter of convenience, the reaction temperature is customarily determined by the boiling point of the lowest-boiling component in the system. And in most instances, the boiling point of the lowest-boiling component generally falls within the range set forth above. For greatest convenience, the reactions are preferably carried out at atmospheric pressure. However, it is possible to vary pressures somewhat, although there appears to be no particular advantage in so doing.

A recovery system can easily be incorporated to recycle by-products and recover the product simultaneously, since products are always much less volatile than the by-products, making their separation an elementary problem of distillation. Yields in excess of 90% based on the boron halides may easily be realized depending on the recovery system efficiency.

The entire group of compounds containing boron-carbon bonding is highly susceptible to oxidation and, in fact, spontaneously inflammable in air, necessitating that they be handled under inert and dry atmospheres.

The general formulae representing the various metathetical reactions are set forth below.

Preparation of alkyldichloroborines:

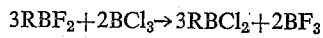
$$3RBF_2 + 2BCl_3 \rightarrow 3RBCl_2 + 2BF_3$$

Preparation of alkyldibromoborines:

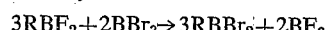
$$3RBF_2 + 2BBr_3 \rightarrow 3RBBr_2 + 2BF_3$$

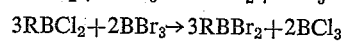
$$3RBCl_2 + 2BBr_3 \rightarrow 3RBBr_2 + 2BCl_3$$

Preparation of alkyldiiodoborines:

$$3RBF_2 + 2BI_3 \rightarrow 3RBI_2 + 2BF_3$$

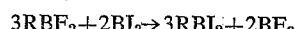
$$3RBCl_2 + 2BI_3 \rightarrow 3RBI_2 + 2BCl_3$$

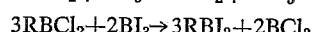
$$3RBBr_2 + 2BI_3 \rightarrow 3RBI_2 + 2BBr_3$$

Reactions analogous to the above may be written for the preparation of each of the bis(dihaloborino)alkanes, of which the following is typical:

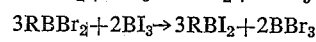
$$3R'(BCl_2)_2 + 4BBr_3 \rightarrow 3R'(BBr_2)_2 + 4BCl_3$$

wherein R' is a polymethylene group. R and R' in the above reactions may also represent aralkyl groups and R and R' may be cycloalkyl as well as straight or branched chain materials. One or more of the hydrogens on the alkyl or aryl portion may also be replaced with other groups, as, for example, halogens or lower alkyl groups.

A wide variety of organo compounds will react in this manner, as set out in the following illustrative examples.

EXAMPLE I.—ETHYLDIBROMOBORINE

A small quantity of boron tribromide (37.5 grams) was placed in a 250 ml. round-botton flask and ethyldichloroborine (18.0 grams) was transferred into it on a high vacuum system. The mixture was refluxed for seven hours at the boiling point at 760 mm. Hg (50–92° C.) until 7.6 ml. of boron trichloride was removed. This represents an 85% yield. The product and excess boron tribromide were separated by fractional distillation under argon. Ethyldibromoborine has a boiling point of 95.0° C./760 mm. Hg. Analysis of the product is as follows:

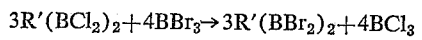

| Component | Weight Percent | |
|---|---|---|
| | Found | Calc. |
| B | 5.2 | 5.4 |
| Br | 79.9 | 80.3 |

EXAMPLE II.—BIS(DIBROMOBORINO)ETHANE

Bis(dichloroborino)ethane, $C_2H_4(BCl_2)_2$, (16.2 grams), and an excess of boron tribromide (40.0 grams) were placed in a 250 ml. round-bottom flask. All transferring was done in an inert atmosphere dry box. The mixture was brought to refluxing and after one hour, at a temperature of 92° C. (760 mm. Hg) 7 ml. of boron trichloride had been removed. This represents a 76% yield. The resulting high boiling mixture was then vacuum distilled with a spinning-band column. Only one fraction was observed and it was removed at 30° C./1 mm. Hg. The distillate was clear and colorless. Analysis of the product is as follows:

| Component | Weight Percent | |
|---|---|---|
| | Found | Calc. |
| B | 6.0 | 5.9 |
| Br | 85.6 | 86.5 | materials may be prepared in the manner described by A. B. Burg, J. Am. Chem. Soc., 62, 2228 (1940). Compounds of the general formulae $RBCl_2$, $RBBr_2$ and $RBI_2$ may be prepared as set forth in our co-pending application, Serial No. 707,124, filed January 6, 1958, for Organoboron Compounds.

Obviously, many modifications and variations may be made without departing from the spirit and scope of this invention and therefore only such limitations should be imposed as are indicated in the appended claim.

*Table I.—Alkyl and Aryldihaloborines*

| Example | Dihaloborine Reactant | Boron Trihalide | Product | Wt. Percent B | Wt. Percent Halogen |
|---|---|---|---|---|---|
| III | $(CH_3)_2CHBCl_2$ | $BBr_3$ | $(CH_3)_2CHBBr_2$ | 5.06 | 74.78 |
| IV | $Cl_2BCH_2CH_2BCl_2$ | $BI_3$ | $I_2B(CH_2)_2BI_2$ | 3.88 | 91.02 |
| V | $CH_3CH(BCl_2)CH_2CH_2BCl_2$ | $BBr_3$ | $CH_3CH(BBr_2)(CH_2)_2BBr_2$ | 5.45 | 80.44 |
| VI | $C_6H_{11}BCl_2$ | $BBr_3$ | $C_6H_{11}BBr_2$ | 4.26 | 67.24 |
| VII | $(CH_3)_3CBCl_2$ | $BI_3$ | $(CH_3)_3CBI_2$ | 3.49 | 81.90 |
| VIII | $BrCH_2CH(CH_3)BCl_2$ | $BBr_3$ | $BrCH_2CH(CH_3)BBr_2$ | 3.70 | 81.92 |
| IX | $CH_3(CH_2)_3CH CH_2BBr_2$ | $BI_3$ | $CH_3(CH_2)_3CH_2CH_2BI_2$ | 3.09 | 72.52 |
| X | $CH_3CH(BCl_2)CH(BCl_2)CH_3$ | $BBr_3$ | $CH_3CH(BBr_2)CH(BBr_2)CH_3$ | 5.45 | 80.44 |
| XI | $(C_2H_5)_2CHCH(BCl_2)CH_3$ | $BBr_3$ | $(C_2H_5)_2CHCH(BBr_2)CH_3$ | 4.01 | 63.23 |
| XII | $(CH_3)_2C(BCl_2)CH_2CH_2C(BCl_2)(CH_3)_2$ | $BBr_3$ | $(CH_3)_2C(BBr_2)(CH_2)_2C(BBr_2)(CH_3)_2$ | 4.77 | 70.48 |
| XIII | $CH_2CH(BCl_2)(CH_2)_3CH(BCl_2)CH_2CH_2$ | $BBr_3$ | $CH_2CH(BBr_2)(CH_2)_3CH(BBr_2)CH_2CH_2$ | 4.79 | 70.80 |
| XIV | $CH_3\text{-C}_6H_3(Cl_2B)(CH_3)\text{-}C(BCl_2)CH_3$ | $BBr_3$ | $CH_3\text{-C}_6H_3(Br_2B)(CH_3)\text{-}C(BBr_2)CH_3$ | 4.51 | 66.67 |
| XV | $CH_3(CH_2)_{13}CH(BCl_2)CH_3$ | $BBr_3$ | $CH_3(CH_2)_{13}CH(BBr_2)CH_3$ | 2.73 | 40.35 |
| XVI | $C_6H_5CH(BCl_2)CH_2BCl_2$ | $BBr_3$ | $C_6H_5CH(BBr_2)CH_2BBr_2$ | 4.86 | 71.76 |
| XVII | $C_6H_5CH_2CH(BCl_2)CH_3$ | $BBr_3$ | $C_6H_5CH_2CH(BBr_2)CH_3$ | 3.73 | 55.14 |
| XVIII | $C_6H_5C(CH_3)(BBr_2)CH_3$ | $BI_3$ | $C_6H_5C(CH_3)(BI_2)CH_3$ | 2.82 | 66.09 |
| XIX | $IC_6H_4CH(BCl_2)CH_3$ | $BI_3$ | $IC_6H_4CH(BI_2)CH_3$ | 2.18 | 76.78 |
| XX | $CH_3C_6H_4CH(BCl_2)CH_3$ | $BBr_3$ | $CH_3C_6H_4CH(BBr_2)CH_3$ | 3.73 | 55.14 |
| XXI | $[-CH_2CH(BCl_2)(CH_2)_2CHBCl_2]_2$ | $BBr_3$ | $[-CH_2CH(BBr_2)(CH_2)_2CHBBr_2]_2$ | 5.29 | 78.07 |
| XXII | $C_6H_5C_6H_4CH(CH_3)(BCl_2)CH_3$ | $BBr_3$ | $C_6H_5C_6H_4 CH(CH_3)(BBr_2)CH_3$ | 2.95 | 43.55 |
| XXIII | $(C_6H_5)_2C(BCl_2)CH_3$ | $BBr_3$ | $(C_6H_5)_2C(BBr_2)CH_3$ | 3.16 | 46.75 |
| XXIV | $C_6H_5CH(BCl_2)CH(BCl_2)C_6H_5$ | $BBr_3$ | $C_6H_5CH(BBr_2)CH(BBr_2)C_6H_5$ | 4.15 | 61.29 |
| XXV | $BrC_6H_4 CH(BCl_2)CH_3$ | $BBr_3$ | $BrC_6H_4CH(BBr_2)CH_3$ | 3.05 | 67.59 |
| XXVI | $(CH_3)_2C(BCl_2)_2$ | $BBr_3$ | $(CH_3)_2C(BBr_2)_2$ | 5.64 | 83.38 |
| XXVII | $(CH_3)_3CBCl_2$ | $BBr_3$ | $(CH_3)_3CBBr_2$ | 4.75 | 70.17 |
| XXVIII | $CH_3BF_2$ | $BCl_3$ | $CH_3BCl_2$ | 11.16 | 73.12 |
| XXIX | $CH_3BF_2$ | $BI_3$ | $CH_3BI_2$ | 3.87 | 90.76 |
| XXX | $CH_3BF_2$ | $BBr_3$ | $CH_3BBr_2$ | 5.83 | 86.08 |
| XXXI | $C_6H_5C(CH_3)(BF_2)CH_3$ | $BCl_3$ | $C_6H_5C(CH_3)(BCl_2)CH_3$ | 5.39 | 35.29 |
| XXXII | $(CH_3)_2C(BF_2)_2$ | $BCl_3$ | $(CH_3)_2C(BCl_2)_2$ | 10.29 | 69.00 |

Further examples are set forth in the table which follows. The formula for each haloborine reactant (and hence for the product also) is conditioned upon the assumption that the reaction by which the said reactant is prepared follows Markownikoff's rule. Hence, it is not desired to limit the invention to specific structural formulae, though there is reason to believe the structural assignments set forth here are correct.

In various of the examples set out herein, compounds of the general formula $RBF_2$ are used as reactants. These

We claim:

A process comprising reacting in an inert atmosphere ethyldichloroborine with boron tribromide whereby to replace the chlorine bonded to the boron of said ethyldichloroborine with the bromine bonded to the boron of said boron tribromide.

References Cited in the file of this patent

McCusher et al.: J.A.C.S. 79, 5186 (1957).
Martin: Boron Trifluoride and its Derivatives (1949), page 32.